(12) United States Patent
Crick

(10) Patent No.: US 7,330,933 B2
(45) Date of Patent: Feb. 12, 2008

(54) APPLICATION CACHE PRE-LOADING

(75) Inventor: Darl Andrew Crick, Keswick (CA)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 10/906,820

(22) Filed: Mar. 8, 2005

(65) Prior Publication Data

US 2005/0240652 A1    Oct. 27, 2005

(30) Foreign Application Priority Data

Apr. 21, 2004   (CA) .................................. 2465065

(51) Int. Cl.
*G06F 12/02* (2006.01)
(52) U.S. Cl. ...................................... 711/118
(58) Field of Classification Search ................. 711/118
See application file for complete search history.

(56) References Cited

U.S. PATENT DOCUMENTS

| | | | |
|---|---|---|---|
| 5,586,295 A | 12/1996 | Tran | 711/137 |
| 5,752,262 A | 5/1998 | Cassetti et al. | 711/135 |
| 6,370,614 B1 | 4/2002 | Teoman et al. | 711/113 |
| 7,046,689 B2 * | 5/2006 | Burns et al. | 370/429 |
| 7,062,756 B2 * | 6/2006 | Kamen et al. | 717/127 |
| 2001/0051927 A1 * | 12/2001 | London et al. | 705/51 |
| 2004/0133848 A1 * | 7/2004 | Hunt et al. | 715/500 |
| 2004/0205149 A1 * | 10/2004 | Dillon et al. | 709/217 |
| 2004/0243555 A1 * | 12/2004 | Bolsius et al. | 707/3 |

* cited by examiner

*Primary Examiner*—Kevin L. Ellis
(74) *Attorney, Agent, or Firm*—Jeanine Ray-Yarletts, Esq.; Steven M. Greenberg, Esq.; Carey Rodriguez Greenberg & Paul LLP

(57) ABSTRACT

The invention reduces the system processing and user response time spikes normally associated with cache flushes and adds to the effectiveness of the cache returned to service through pre-loading of cache data on a staging server. Statistical data is captured representative of application data usage and analyzed in accordance with customizable rules. Candidate data for caching is determined from the statistical data and pre-loaded onto the staging server. This pre-loaded, staged data is then pushed into the production data cache, thereby reducing downtime of the cache.

15 Claims, 3 Drawing Sheets

APPLICATION CACHE PRE-LOADING

The present invention relates generally to electronic data processing systems and more particularly to electronic data processing systems having application cache memory.

BACKGROUND OF THE INVENTION

Improvements in electronic data processing systems have generally been directed toward reduction in the time required to service applications and process information along with the related costs of the infrastructure in support of the faster processing. A wide variety and number of memory and storage designs have been implemented as electronic data processing systems have evolved. One such implementation is the use of cache memory in one form or another to improve response times for data access. Applications having access to such caching technology benefit through the reduction in data access times.

The size of cache memory is often less than desired for a particular application. The size allocated for a cache is determined by a trade off between the cost of the device and the performance to be attained. The realization that a complete application and its data cannot usually reside in a cache leads to cache management techniques. The cache size constraints mean that decisions have to be made regarding cache content during application execution time.

The value of a cache increases with the applicability of the data contained therein. The applicability of the data is determined by the referencing of the data. Ideally only the recently used or most likely to be accessed data should be maintained in the cache.

Prior implementations of caching have used a variety of techniques to determine what data should be cached and how long that data should remain in the cache if it is not referenced. These implementations have been targeted towards various specific situations resulting in varying levels of success.

Typically there is a need to flush a cache to remove unwanted data. Whenever a cache is flushed it is effectively offline to the users of that cache. This results in downtime for the cache and increased response time for users requesting data managed through the cache while waiting for the cache recovery. Having flushed the cache, it then needs to be reloaded with data for use by the application users. Some implementations employ a "lazy" technique of allowing the cache to be populated over time by the data requests, while other implementations attempt to prime the cache before use.

All of these actions take time and therefore reduce the effectiveness of the cache while it is effectively "offline" or "marginally on-line. It would therefore be highly desirable to have a method and software allowing a faster more efficient means of returning a cache to productive service.

SUMMARY OF THE INVENTION

Conveniently, software exemplary of the present invention allows for a reduction in system processing and user response time spikes normally associated with cache flushes and adds to the effectiveness of the cache returned to service through pre-loading of data implemented on a staging server.

In an embodiment of the present invention there is provided a computer implemented method for updating application data in a production data cache, comprising: capturing statistical data representative of the application data usage; analysing the statistical data in accordance with customizable rules; generating candidate data from the statistical data; pre-loading the candidate data; and pushing the pre-loaded candidate data into the production data cache.

In another embodiment of the present invention there is provided a computer system for updating application data in a production data cache, comprising: a means for capturing statistical data representative of the application data usage; analyser for analysing the statistical data in accordance with customizable rules; generator for generating candidate data from the statistical data; a means for pre-loading the candidate data; and a means for pushing the pre-loaded candidate data into the production data cache.

In yet another embodiment of the present invention there is provided an article of manufacture for directing a data processing system update application data in a production data cache, comprising: a computer usable medium embodying one or more instructions executable by the data processing system, the one or more instructions comprising: data processing system executable code for capturing statistical data representative of the application data usage; data processing system executable code for analysing the statistical data in accordance with customizable rules; data processing system executable code for generating candidate data from the statistical data; data processing system executable code for pre-loading the candidate data; and data processing system executable code for pushing the pre-loaded candidate data into the production data cache.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate embodiments of the present invention by example only.

Like reference numerals refer to corresponding components and steps throughout the drawings.

DETAILED DESCRIPTION

Figure 1:
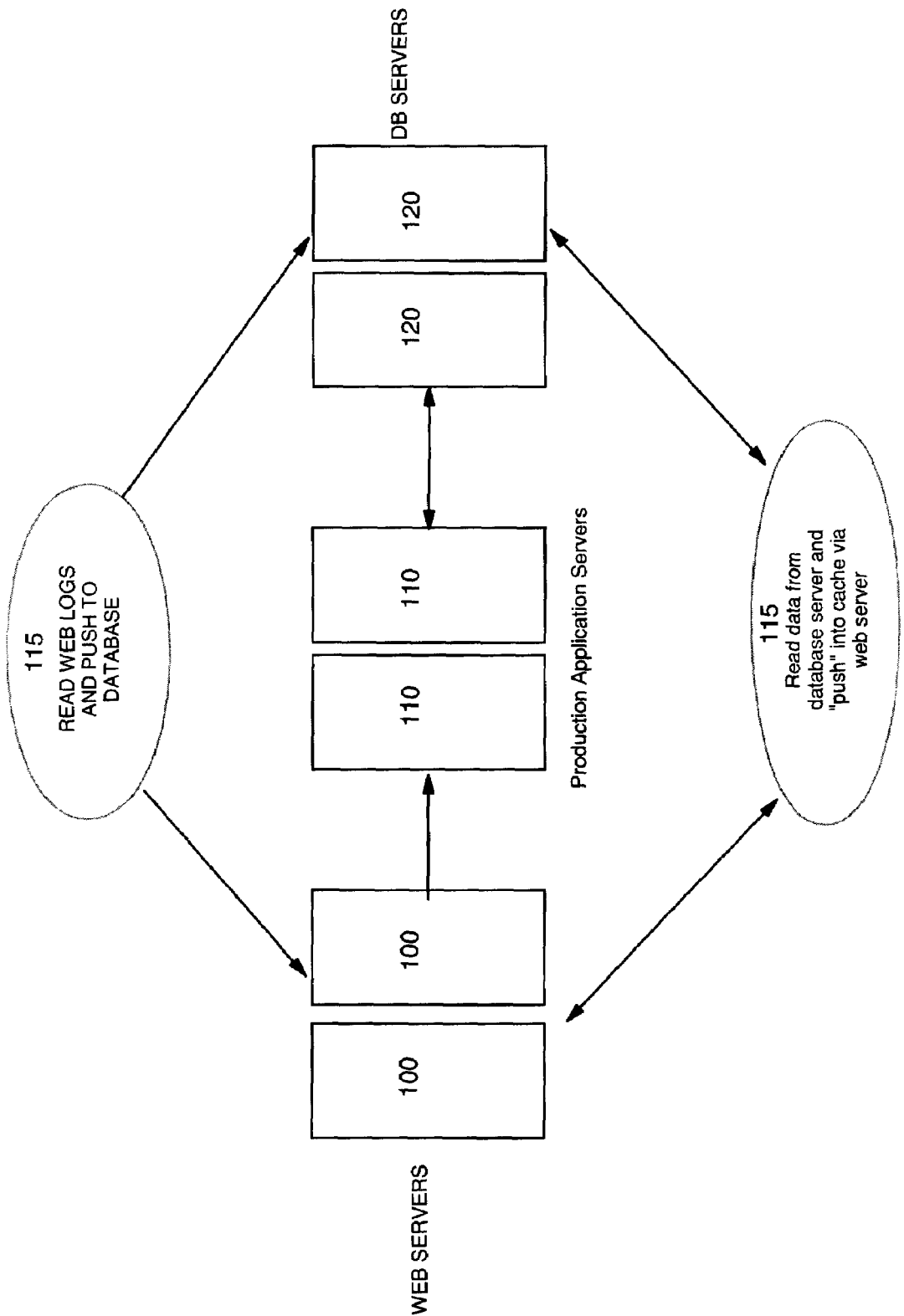
FIG. 1 is a block diagram showing the components in a preparation phase in support of an embodiment of the present invention.

Significant information may be extracted from the various web servers or other similar servers as these servers generate most of the information relevant to the task at hand. The web server data is collected and aggregated on a form of database server for ease of processing and to avoid the processing load being placed on the production server. The database server is a reasonably good candidate because it would typically have the space and tools associated for data analysis.

In one example the specific information being sought from the web servers is the URL information for pages referenced by users and typically captured in the web server log files. All of the parametric data associated with the URLs is also of interest. In fact, the harvesting of this type of information can be managed by an automated scheduled process or performed manually.

Logs from a caching proxy or web server can be used in most cases, but sometimes more detailed information is needed when a lot of user based personalization is used. This can be done using site logging that captures the user's detailed information, but this requires the application to capture this data and supply it to the capture phase of the caching pre-load tooling. In some sites it may not be necessary to actually capture this data but knowledge of the site can be used to load the cache by using a userid that acts similar to an actual user on the site. Using simulated userids or userids that belong to groups may be an important means to load pages that are personalized or are only viewed by groups of users. In some cases, if fragments are being used, then loading a portion of a page and leaving the personalized portion for the user to actually execute is much better than not loading anything and provides great value in reducing the cost of first execution.

Once the log data has been made available in the database server, various tools as are known in the art for data analysis may be used to analyse the data. The purpose of the data mining activity is to discover patterns or trends in the data that may be useful in determining page activity to identify candidates for caching. The data may have been analysed in a number of suitable ways such as frequency of use, duration of time on web server, related pages and other means of categorizing and comparing the data.

Making sure that the right cache data is pre-loaded is important to the success of maximizing the hit ratio on the cache. Now that the database has been loaded with the information on what pages had been viewed, the power of a database query language such as SQL can be used to extract data from the database to produce the pre-load data based on many different algorithms. The tooling allows the user to also input criteria in the SQL they wish to use, thus giving the flexibility to the user to use their domain knowledge. Some of the selection criteria that can be used are listed below.

Select the top viewed pages since the start of the site.

Select the top viewed pages this month, week, day, quarter, and half year.

Select the top pages for this month based on last year's data or several years of data.

Select the top pages for the day of week based on all the data for this day.

Select the top pages for this holiday period based on the last holiday period or periods.

Select the top pages for the end/beginning/middle of the month as people may shop differently during the month.

Select the top pages when you have a sale based on the last time you had a sale.

Select the pages you know are the most common for your site or load a complete catalog.

Having completed an analysis of the data and produced lists of candidates of varying types the pre-load is then initiated from a database server to a staging server. It is to be noted that placement of data onto the staging server should not affect a production server. Further, all work done in preparing the data for caching has been performed off the production server to avoid any unnecessary load on the production server.

With a completion of the pre-load activity on the staging serve, the data from the cache-only portion of the staging server is then "pushed" out and onto the production server. This minimizes the outage on the production server to the time required to push the new data into the production server cache. Further the newly received data has been optimized for ready use.

FIG. 1 illustrates in block diagram form the components of an embodiment of the present invention as used in the preparation phase of the process. Web servers 100 provide "pages" of data on request to application users of application servers 110. Web logs from web servers 100 are readily available and provide an excellent source of information to aid in the discovery and understanding of data access patterns. Database servers 120 are used by the process of staging servers 115 to receive data from web servers 100. Data collection can be automated and scheduled based on some time frequency or triggered by some other event such as manual initiation. Ideally data filtering is used to cause only needed data to be extracted from web servers 100. Data is then made ready on staging serves 115 for replacement on production application servers 110.

Figure 2:
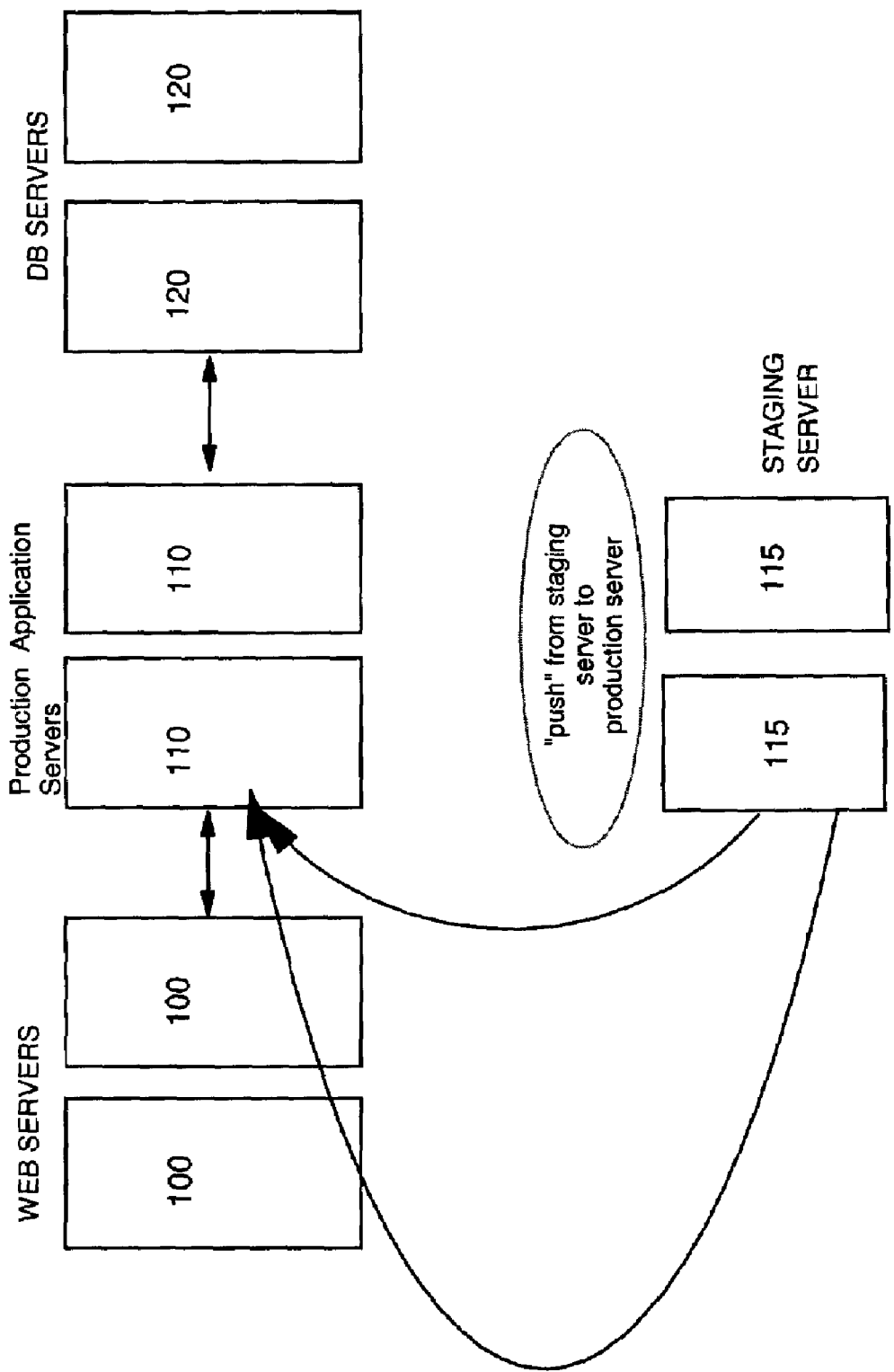
FIG. 2 is a block diagram showing components in an activation phase in support of the embodiment described in FIG. 1.

Referring now to FIG. 2 the activation phase of the process is shown. The cache of production server 110 has been flushed and is therefore ready to receive caching data from staging server 115. The process reduces the stress on production server 110 that might have been caused by data collection and analysis work being performed on production server 110. The cache flush operation can then be performed relatively quickly as the replacement data is already prepared for use on staging server 115.

Figure 3:
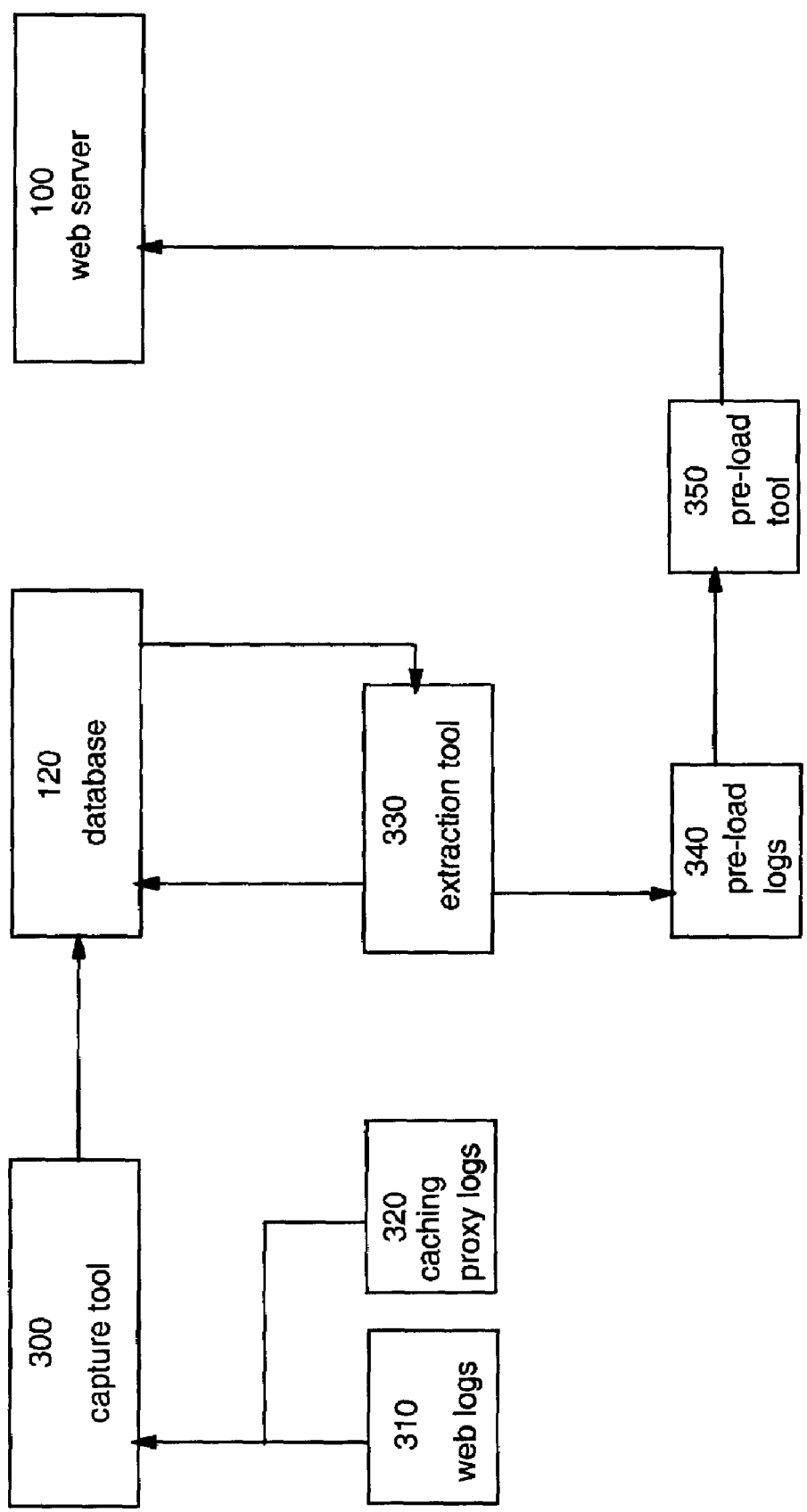
FIG. 3 is a block diagram of the tooling components as may be used in support of the embodiments of FIGS. 1 and 2.

FIG. 3 is a simplified view of an overall tooling used during the process in a preferred illustrative embodiment of the present invention. Capture tool 300 is responsible for gathering all required data from sources such as web logs 310 and caching proxy logs 320. Web logs 310 and caching proxy logs 320 can be found on web servers 100 and similar servers. Capture tool 300 sends output to database 120, which acts as a repository for all of the retrieved data and provides an environment for analysis tools to be used. The collected data is assembled, combined or aggregated into a form suitable for further processing. Relevant data may be determined in any number of accepted and known manners, but ideally should be application specific to address the caching targets of the application server. As stated earlier, URLs of previously referenced pages served by web servers 100 may be of particular interest but they are only one form of statistic that might be relevant.

Extraction tool 330 performs activities related to data mining and analysis. The intent of this activity is to determine candidate data for caching. Data stored in database servers 120 may be sifted, sorted, analysed to discover trends, relationships or other usage patterns of particular value. Extraction tool 330 allows the use of SQL to be used on the stored data providing a robust query environment in which to perform data analysis and reduction. Having the full power of SQL provides an easier means of selection of various criteria to be used on the data of interest. The result of performing of SQL queries is the production of pre-load logs 340 that may be in the form of "lists" or clusters of data. As previously discussed, URLs might be one type of information of interest and can be categorized by frequency of use, by trend, by association or relationship with other respective URLs or a specific product affinity perhaps or categorized in some other meaningful manner.

The capability to pre-populate a JSP (Java server pages) cache based on web log data provides a powerful means to improve the performance and value of the cache. The use of the database provides an opportunity to introduce customizable log analysis rules that are supported through SQL queries. The actual web log data can also be merged with other business related data as might be found in a data mart. Specific and customizable rule sets can then be developed to exploit initially non-obvious trends or patterns. The results of such custom queries on the newly aggregated data can lead to unique cache pre-population instances. SQL capability can be further exploited to handle the more complex situations in resolving grouping users and respective URL requests. Analysis can then use one or more predetermined or customized SQL queries based on a merger of web log data and business data.

Having produced such lists or clusters of pre-load data on staging server 115, this data is then made available to pre-load tool 350. After a cache flush has been initiated and completed on production server 110, the data pre-loaded on staging server 115 is "pushed" onto web server 100 as shown in FIG. 3 or onto production servers 110 as shown in FIG. 2 by pre-load tool 350 and the process is completed.

Web servers 100 or production servers 110 have then received cache data that has been analysed and "tuned" to provide a more effective hit ratio than might have been otherwise available, thereby improving the value of the caching service. The fact that the data has been moved as a transfer operation without having to create such data during the move minimizes the cache downtime to only that time needed to effect the transfer. Once the load has been completed the cache is immediately ready for use.

Data transfer might have occurred through web servers 100 or directly from staging servers 115 to production servers 110 as desired by the installation. Data collection and analysis can be performed regularly so as to have a ready set of caching candidates available for use, subject to a cache flush and re-load request. Advance preparation of candidate data is required to maintain effective response times for cache reload and is recommended to avoid potential problems of "stale" data being used in cache reload. Although database servers 120 are used in the embodiment just described it can be appreciated that any suitable form of data storage and file handling mechanism that supports the aggregation of data and tools to analyse such data can be used. Further the "lists" that were prepared can in fact not be lists but other forms of output prepared by tools of convenience. Ideally the data reduction and analysis tools should prepare output ready for use by the staging operation to reduce further processing requirements. The servers mentioned might or might not exist on a single system, as they may be easily networked together with the only requirement being to move data quickly into the production server 110 cache from staging server 115. A single system of sufficient capacity might support the servers of the embodiment shown.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A computer implemented method for updating application data in a production data cache, comprising:
    capturing statistical data representative of the application data usage;
    analysing the statistical data in accordance with customizable rules;
    generating candidate data from the statistical data;
    pre-loading the candidate data; and
    pushing the pre-loaded candidate data into the production data cache, wherein
    pushing the pre-load candidate data is responsive to a cache flush command terminating.

2. The computer implemented method of claim 1, further comprising
    generating new candidate data, and
    updating the pre-loaded candidate data with the new candidate data prior to the pre-loaded candidate data being pushed into the production data cache.

3. The computer implemented method of claim 1, wherein the capturing statistical data representative of the application data usage includes URLs with respective parameters.

4. The computer implemented method of claim 1, wherein analysing the statistical data is performed using an at least one of predetermined and customizable SQL queries, and the customizable rules are based on a merger of web log data and business data.

5. The computer implemented method of claim 1, wherein generating candidate data from the statistical data comprises producing at least one instance of candidate data instances selected from a group comprising:
    a top 'n' number of pages viewed, a top 'n' number of pages of each type of page viewed, a top 'n' number of pages of a limited set of types of pages viewed, top 'n' number of pages from a previous time period of a same type viewed, and a top 'n' number of pages viewed from a specified time period coinciding with a predetermined event.

6. A computer system for updating application data in a production data cache, comprising:
    an extraction tool for capturing statistical data representative of the application data usage;
    an analyser for analysing the statistical data in accordance with customizable rules;
    a generator for generating candidate data from the statistical data;
    a pre-loading tool for pre-loading the candidate data; and
    a pushing tool for pushing the pre-loaded candidate data into the production data cache, wherein
    the pushing tool is responsive to a cache flush command terminating.

7. The computer system of claim 6, wherein
    the generator generates new candidate data, and
    the pre-loading tool updates the pre-loaded candidate data with the new candidate data prior to the pre-loaded candidate data being pushed into the production data cache.

8. The computer system of claim 6, wherein the extraction tool includes URLs with respective parameters.

9. The computer system of claim 6, wherein the analyser for analysing the statistical data uses an at least one of predetermined and customizable SQL queries, and the customizable rules are based on a merger of web log data and business data.

10. The computer system of claim 6, wherein the generator for generating candidate data from the statistical data comprises producing at least one instance of candidate data instances selected from a group comprising:
    a top 'n' number of pages viewed, a top 'n' number of pages of each type of page viewed, a top 'n' number of pages of a limited set of types of pages viewed, top 'n' number of pages from a previous time period of a same type viewed, and a top 'n' number of pages viewed from a specified time period coinciding with a predetermined event.

11. An article of manufacture for directing a data processing system to update application data in a production data cache, comprising:
 a computer usable medium embodying one or more instructions executable by the data processing system, the one or more instructions comprising:
 data processing system executable code for capturing statistical data representative of the application data usage;
 data processing system executable code for analysing the statistical data in accordance with customizable rules;
 data processing system executable code for generating candidate data from the statistical data;
 data processing system executable code for pre-loading the candidate data; and
 data processing system executable code for pushing the pre-loaded candidate data into the production data cache, wherein
 the data processing system executable code for pushing the pre-load candidate data is responsive to a cache flush command terminating.

12. The article of manufacture of claim 11, further comprising
 data processing system executable code for generating new candidate data, and
 data processing system executable code for updating the pre-loaded candidate data with the new candidate data prior to the pre-loaded candidate data being pushed into the production data cache.

13. The article of manufacture of claim 11, wherein the data processing system executable code for capturing statistical data representative of the application data usage includes URLs with respective parameters.

14. The article of manufacture of claim 11, wherein the data processing system executable code for analysing the statistical data uses an at least one of predetermined and customizable SQL queries, and the customizable rules are based on a merger of web log data and business data.

15. The article of manufacture of claim 11, wherein the data processing system executable code for generating candidate data from the statistical data comprises producing at least one instance of candidate data instances selected from a group comprising:

a top 'n' number of pages viewed, a top 'n' number of pages of each type of page viewed, a top 'n' number of pages of a limited set of types of pages viewed, top 'n' number of pages from a previous time period of a same type viewed, and a top 'n' number of pages viewed from a specified time period coinciding with a predetermined event.

* * * * *